No. 864,286. PATENTED AUG. 27, 1907.
W. H. BARHAM.
ATTACHMENT FOR CULTIVATOR BEAMS.
APPLICATION FILED MAY 13, 1907.
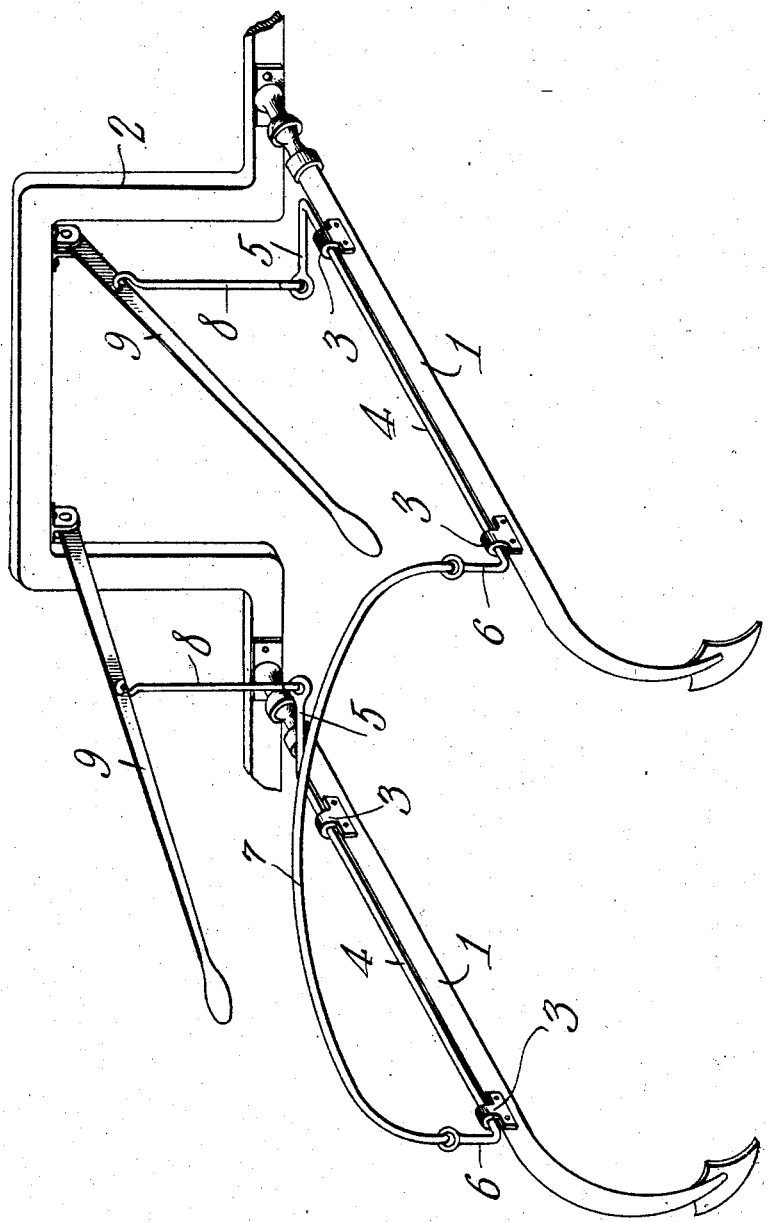
WITNESSES:
William H. Barham,
INVENTOR.
By C. A. Snow & Co.
ATTORNEYS

UNITED STATES PATENT OFFICE.

WILLIAM H. BARHAM, OF MOODY, TEXAS.

ATTACHMENT FOR CULTIVATOR-BEAMS.

No. 864,286.　　　　　Specification of Letters Patent.　　　　　Patented Aug. 27, 1907.

Application filed May 13, 1907. Serial No. 373,394.

To all whom it may concern:

Be it known that I, WILLIAM H. BARHAM, a citizen of the United States, residing at Moody, in the county of McLennan and State of Texas, have invented a new and useful Adjustable Arch-Bar Attachment for Cultivator-Beams, of which the following is a specification.

This invention has relation to adjustable arch-bar attachments for cultivator beams especially adapted to be used for moving the beams of a straddle row cultivator in lateral directions and it consists in the novel constructions and arrangement of its parts as hereinafter shown and described.

The object of the invention is to provide an adjusting attachment of the character indicated which may be easily and readily operated by swinging levers in vertical directions for moving the rear ends of the cultivator beams in lateral directions. By such an attachment it is possible for an operator to move the cultivator shovels in and out along a row of plants so that the plants may be worked as close to the row as is desired even though the alinement of the row should not be straight.

In the accompanying drawing:—The figure is a perspective view of the attachment applied to the arch bar and beams of a straddle row cultivator.

The forward ends of the beams 1 are pivotally connected with the arch-bar or axle 2, as shown, or may be pivotally connected with any other parts of the frame of a cultivator in the usual manner. Each beam 1 is provided with the bearing 3 and in each set of bearings 3 is journaled a shaft 4. That is to say, there is a shaft 4 mounted upon each beam 1. The shafts 4 are provided with the horizontally disposed cranks 5 located at their forward ends and the vertically disposed cranks 6 located at their rear ends. In other words, the cranks 5 and 6 are disposed substantially at a right angle to each other. The arch-rod 7 is pivotally connected at its ends to the upper ends of the cranks 6, 6. The links 8 are pivotally connected at their lower ends to the cranks 5. The upper ends of the links 8 are pivotally connected with the levers 9 which in turn are fulcrumed to the arch bar 2 or any other suitable portion of the frame work of the implement.

From the foregoing description it is obvious that by raising or lowering the free end of either one of the levers 9 that the shaft 4 connected with the said lever by the link 8 will be partially rotated and at the same time the rear end of the beam 1 upon which the said shaft is mounted will be swung laterally, the connection between the arch bar 7 and the crank 6 serving as a pivot. Thus it is possible to move the said beams at their ground engaging ends in lateral directions for the purposes above specified.

Having described my invention what I claim as new and desire to secure by Letters Patent is:—

1. In combination with a straddle row cultivator having beams pivotally connected therewith at their forward ends, an attachment comprising a shaft journaled upon each beam, a means for partially rotating said shaft and an arch rod connecting said shafts together and having pivotal connecting joints therewith.

2. In combination with a straddle row cultivator having beams pivoted at their forward ends thereto, an attachment comprising bearings mounted upon the beams, shafts journaled in said bearings, each shaft having at its opposite end cranks which are disposed substantially at right angles to each other, an arch rod connecting the rear cranks of the shafts together and having pivotal connection therewith and levers fulcrumed upon the cultivator and being operatively connected with the forward cranks of the shafts.

In testimony that I claim the foregoing as my own, I have hereto affixed my signature in the presence of two witnesses.

WILLIAM H. BARHAM.

Witnesses:
J. C. REYNOLDS,
G. W. MCNIEL.